United States Patent Office 3,297,719
Patented Jan. 10, 1967

3,297,719
3-HYDROXYMETHYL-3-HYDROXYOXETANE
Gilbert H. Berezin, Newark, Del., assignor to E. I. du Pont de Nemours and Company, Wilmington, Del., a corporation of Delaware
No Drawing. Filed Nov. 27, 1964, Ser. No. 414,411
1 Claim. (Cl. 260—333)

This invention relates to a new oxetane derivative and to a process for its preparation and use.

Polymers are well known in industry to have many uses in films, fibers, adhesives, thickening agents and the like. Polymers which can be cross-linked and, thus, made insoluble and infusible after shaping, are particularly useful.

The present invention provides a novel polymer intermediate, 3-hydroxy-methyl-3-hydroxyoxetane and a process for its preparation and conversion to 3-oxetanone, a monomer which can be polymerized to give useful polymer products of the type described above. 3-oxetanone also has useful solvent properties particularly for cyanoethylcellulouse in making binders for electroluminescent panels.

The 3-hydroxymethyl-3-hydroxyoxetane of this invention is prepared by contacting 3-methyleneoxetane with at least about 2 moles of water per mole of 3-methyleneoxetane and a glycolating agent at a temperature of about from 0 to 75° C., and preferably 0 to 50° C., and a pH of below about 8, and preferably 3 to 7. The resulting glycol of this invention, 3-hydroxymethyl-3-hydroxyoxetane, can be isolated by conventional means or the reaction mixture can be used directly. 3-oxetanone is prepared from the isolated glycol or the crude reaction mixture containing it by contacting the glycol with glycol cleaving agent at a temperature of about 0 to 75° C., and a pH below 8, and preferably 3 to 7. Alternately, the cleaving agent can be charged to the initial reaction mixture and the glycolation and cleaving reactions carried out simultaneously at a temperature of about from 0 to 75° C, and preferably 5 to 25° C. at a pH in the range indicated above.

As just described, the first step in the process of this invention is the glycolation of 3-methyleneoxetane, hereinafter called "the olefin," to yield 3-hydroxymethyl-3-hydroxyoxetane. The 3-methyleneoxetane can be prepared as described by Applequist and Roberts in J. Am. Chem. Soc. 78, 4012–22 (1956). Examples of glycolating agents which can be used in this process include one or more of hydrogen peroxide, osmium tetroxide, ruthenium tetroxide, potassium permanganate and lead tetraacetate. Other glycolating agents which can be used alone or in combination with the aforementioned agents include per acids, for example, aliphatic, aromatic, and cycloaliphatic per acids, preferably of 1 to 8 carbon atoms such as performic, peracetic, perbenzoic, perphthalic, percamphoric, perpropionic acids or a mixture of two or more per acids. The per acids can be used as such or can be prepared in situ by the reaction of hydrogen peroxide with the appropriate organic acid.

As indicated hereinbefore, the temperature of glycolation is preferably below 50° C. and above 0° C. Above 75° C. there is likely to be excessive decomposition of the glycolating agent, particularly of per acids, and below 0° C. the reaction requires an excessive time.

Preferably, there should be greater than one mole of glycolating agent per mole of 3-methyleneoxetane. Any excess can be decomposed at the end of the reaction, but for practical purposes, more than 5 moles of glycolating agent are not used.

Preferably, the glycolation is carried out by treating 3-methyleneoxetane with a catalytic quantity of $OsO_4$ or $RuO_4$ (preferably about from 0.01 to 0.10 part per part of olefin) in the presence of greater than one mole of hydrogen peroxide per mole of olefin at a temperature from about 0 to 50° C. until 3-hydroxymethyl-3-hydroxyoxetane is formed. 3-hydroxymethyl-3-hydroxyoxetane can be isolated from the crude reaction mixture described above by conventional means such as distillation. Alternately, and preferably where the glycol is used in making 3-oxetanone, the crude reaction mixture is treated directly with glycol cleaving agent.

Examples of glycol cleaving agents for oxidizing 3-hydroxymethyl-3-hydroxyoxetane are periodates such as periodic acid and alkali metal periodates such as sodium, potassium and lithium periodates; lead tetraacetate; bismuthates such as the alkali metal bismuthates, especially sodium bismuthate; lead (IV) zeolites (preparation and reactions described in copending application Serial No. 177,239, filed March 5, 1962), and potassium permanganate.

The glycol cleaving agent is used in at least a stoichiometric amount (1 mole per mole of glycol) to oxidize all of the glycol, and preferably an excess of about 0.05 is used.

As indicated hereinbefore, the temperature of oxidation can be from about 0 to 75° C.; preferably, however, the reaction temperature is from about 10 to 25° C.

The solvents used in both the glycolation and glycol cleavage reactions are conventional and would be readily known to one skilled in the art. When peracids are used, the solvent can be the parent acid if it is a liquid. For example, with paracetic acid, acetic acid is used as a solvent. Tertiary alcohols such as tert-butanol and tert-amyl alcohol can also be used as solvents.

When lead tetraacetate is used, acetic acid is a convenient solvent.

Water is a common solvent for oxidizing reactions with periodates, bismuthates and permanganates. In any case, at least two and usually 3 to 50 moles of water per mole of olefin are used in the glycolation reaction.

The oxidation of 3-hydroxymethyl-3-hydroxyoxetane by periodate also can be carried out in an electrolytic cell, as described by Mehltretter in U.S. 2,713,553, and by Conway et al. in Electrochemical Technology 2, 43–50 (1964), wherein only a catalytic quantity of periodate is present initially which is continuously regenerated by the electric current. Such a method makes periodate an economical reagent.

Instead of preparing the 3-oxetanone by the sequential glycolation and cleavage reactions, the glycolation and cleavage can be carried out simultaneously by treating the olefin with a catalytic quantity, preferably 0.01 to 0.10 part per part of olefin, of osmium or ruthenium tetroxide and at least 2 moles of an oxidizing agent strong enough to oxidize the osmium back to $OsO_4$. This simultaneous process is carried out at a temperature of 0 to 75° C., and preferably 5 to 25° C. at a pH of less than 8, and preferably 3 to 7. Amounts of tetroxide greater than 0.10 per part by weight of olefin can be used but are not economical. Examples of cleaving agents that can be used in this simultaneous process are alkali metal periodates and permanganates.

The 3-oxetanone is also isolated by conventional means such as distillation.

1,2-diols wherein one hydroxy group is attached to a carbon member of a four-membered heterocyclic ring containing oxygen are not known. 3-hydroxy-3-hydroxymethyloxetane is a surprisingly high boiling liquid, B.P. 102–105 at 0.3 mm. In addition to being oxidizable to 3-oxetanone, it is useful as a solvent, antifreeze compound and for other uses.

The glycolation of 3-methyleneoxetane is particularly surprising. No example of glycolation of a carbon-carbon double bond exo to a 3 or 4 membered heterocyclic ring has been reported previously. Cleavage of the oxetane ring would be expected. Similar considerations apply to the oxidation of the 3-hydroxymethyl-3-hydroxyoxetane in that cleavage of the four membered ring might be expected. Four-membered rings are notoriously susceptible to ring cleavage because of ring strain.

The invention is illustrated by the following examples which, however, are not intended to be limiting. Parts and percentages are by weight unless otherwise indicated.

EXAMPLE 1

To a vigorously stirred mixture of 50 parts 3-methyleneoxetane, 215 parts cold $H_2O$, and 1 part of $OsO_4$, is slowly added 90 parts 30% $H_2O_2$. The mixture is cooled to 0° C. during the peroxide addition, then allowed to come to room temperature and stand for one hour at a pH of about 7. Filtration through Celite and charcoal gives a clear solution, indicating that the $H_2O$ insoluble methyleneoxetane had reacted.

Water is stripped off the filtrate under reduced pressure, and the viscous residue is fractionated through a spinning band column, yielding 44 parts (60% yield) of light straw-colored liquid, B.P. 102–105 at 3 mm.

Spectral analyses:
  Infrared analyses shows a strong OH stretch, and a broad oxetane ether band at $10.4\mu$.
  NMR shows three singlets, ratio 1:2:1—
    $6.25\tau$—two methylene protons of hydroxy methyl
    $5:45\tau$—4 methylene protons of ring
    $5\tau$ (broad band)—two hydroxyl protons.

Elemental analysis:
  Calculated for $C_4H_8O_3$: C, 46.15; H, 7.75. Found: C, 46.18, 46.18; H, 7.79, 7.92.

This identifies the product as 3-hydroxymethyl-3-hydroxyoxetane.

EXAMPLE 2

*Synthesis of 3-oxetanone monomer*

A mixture of 350 parts of ether, 350 parts of water, 0.5 part of osmium tetroxide and 41 parts of 3-methyleneoxetane is cooled to 0° C. with stirring. Sodium metaperiodate (258 parts) is then added to the well stirred mixture at 0° C. over a period of 1.5 hours, the mixture is stirred and kept at 0° C. for an additional hour, and it is finally allowed to come to room temperature where it remains while stirring is continued for 70 hours. The pH during the reaction is about 4. At the end of this period, the ether layer is decanted. The separate aqueous phase is filtered to remove precipitated sodium iodate, and the iodate is washed by decantation with five successive 133-part portions of methylene chloride. The methylene chloride washes are combined and used for extraction of the aqueous filtrate in a continuous extractor for 48 hours. The methylene chloride and ether solutions are then combined and dried over anhydrous magnesium sulfate. The dry mixture is concentrated by distillation at atmospheric pressure to a black residue of 60 parts. The residue is evaporated under a pressure of 10 mm. into a trap immersed in a bath at −78° C., and stirred with mercury overnight to remove residual iodine, then the condensate in the trap is distilled at 150 mm. to yield 16 parts of pale yellow liquid, B.P. 58–60° C.

The yellow liquid is identified as 3-oxetanone by infrared analysis (absorption at $5.44\mu$ and $10.38\mu$, showing respectively carbonyl and ether oxygen), by nuclear magnetic resonance determination (single peak at $4.48\tau$ from tetramethylsilane, and by elemental analysis.

*Analysis.*—Calcd. for $C_3H_4O_2$: C, 50.00; H, 5.56. Found: C, 49.86; H, 5.80.

The identification is confirmed by preparation of the 2,4-dinitrophenylhydrazone derivative, obtained as yellow needles, M.P. 152–153° C, after two recrystallizations from ethanol (cf. Marshall & Walker, J. Chem. Soc. 1952, 467–75, who report the 2,4-dinitrophenylhydrazone, M.P. 152–155° C.).

*Analysis.*—Calcd. for $C_9H_9O_5N_4$: C, 42.86; H, 3.20; N, 22.2. Found: C, 42.67; H, 3.00; N, 21.94.

EXAMPLE 3

3-methyleneoxetane (35 parts), 180 parts $H_2O$, 0.25 parts $OsO_4$ and 65 parts 90% $H_2O_2$ are mixed. After standing one hour at room temperature under an atmosphere of nitrogen, the solution is again cooled to 0° C., and 110 gm. $NaIO_4$ is added over 1.5 hours. The pH is about 4 after addition of the $NaIO_4$. After one hour of additional stirring at 0° C., the reaction is stirred for 48 hours at room temperature and a pH of about 4.

The solids are filtered off, and washed with four 150-ml. portions of $CH_2Cl_2$. The methylene chloride filtrate is used to continuously extract the aqueous filtrate for 3 days. After this time the methylene chloride phase is worked up as follows: Solvent is stripped off at atmospheric pressure and the residual viscous liquid is stirred with 3 grams of mercury overnight to remove $I_2$. The liquid is decanted from the mercury and mercuric iodide and is distilled through a spinning band column, giving 7 parts 3-oxetanone, B.P. 60° C. at 150 mm. The oxetanone also is identified by its boiling point and infrared spectrum.

Substitution of equimolar quantities of sodium bismuthate, potassium permanganate, lead tetraacetate or lead (IV) zeolites for the $NaIO_4$ above gives similar results.

EXAMPLE 4

*Polymerization of 3-oxetanone in ether*

3-oxetanone (1.18 parts) and sodium-dried ether (7.1 parts) are placed by means of hypodermic syringes into a flask under nitrogen, and the resultant solution is cooled to −20° C. Boron trifluoride etherate (0.024 part) is added in three portions over a period of 12 minutes while the temperature of the cooling bath rises to −9° C. There is no outward appearance of polymerization activity during the addition of boron trifluoride. The solution is stirred overnight at room temperature. A light tan friable solid separates from the ether and a clear, flexible film forms on the wall of the flask above the ether. The film becomes stiff and springy at first as it is dried on a gradually heated copper block then it crumbles at 210° C., darkens at 230° C., and chars at 280–300° C. The friable solid is filtered, washed with methanol and dried overnight at 70° C. in a vacuum oven to yield 0.27 part of polymer.

The polymer is soluable in s-dichlorotetrafluoroacetone hydrate showing an inherent viscosity of 0.09 at 0.1% concentration and 25° C. Infrared analysis shows absorption peaks at $2.92\mu$, $3.45\mu$, $5.77\mu$, and $6.15\mu$, and a broad band at $9.0$–$9.5\mu$. In the copper block test it coalesces somewhat at 170° C., turns light tan at 210° C., becomes brown and felt-like at 265° C., and embrittles with further darkening at 310° C.

An air-dried 1-mil film is cast from a solution of the friable solid in s-dichlorotetrafluoroacetone hydrate containing 2% triethylamine.

EXAMPLE 5

Cyanoethylcellulose (D.S. 2.58) (2.5 parts) is dissolved in 3-oxetanone (20 parts). RCA green phosphor 33–Z–235A (2.25 parts) is added and the mixture stirred until dispersion is complete. The mixture is cast onto the conductive side of a piece of 3″ x 5″ conductive glass plate using a 10 mil doctor blade. The film is then dried in a forced-draft oven at 80–100° C. A silver electrode 1″ in diameter is then applied to the phosphor-binder layer by spraying a silver toluene dispersion onto the layer. Final drying is accomplished at 80–100° C. in a forced-draft oven.

When 125 volts 60 cycle current is applied to the electrodes the film luminesces.

Similar results are obtained when cyanoethylstarch, cyanoethylamylose, and cyanoethylamylopectin are substituted for the cyanoethyl cellulose.

I claim:
3-hydroxymethyl-3-hydroxyoxetane.

References Cited by the Examiner

Fieser et al.: Organic Chemistry, 3rd edition (1956), pages 129, 288–289.

WALTER A. MODANCE, *Primary Examiner.*

NORMA S. MILESTONE, *Assistant Examiner.*